(12) United States Patent
Qi et al.

(10) Patent No.: US 11,987,662 B2
(45) Date of Patent: May 21, 2024

(54) ENVIRONMENTALLY-FRIENDLY FLEXIBLE CONDUCTIVE POLYURETHANE (PU) AND PREPARATION METHOD THEREOF

(71) Applicants: SHAOXING-KEQIAO INSTISUTE OF ZHEJIANG SCI-TECH UNIVERSITY CO., LTD., Shaoxing (CN); ZHEJIANG SCI-TECH UNIVERSITY, Hangzhou (CN)

(72) Inventors: Dongming Qi, Hangzhou (CN); Zhichao Huang, Hangzhou (CN); Qianjun Tian, Hangzhou (CN); Lin Wang, Hangzhou (CN); Chenghai Liu, Shaoxing (CN)

(73) Assignees: SHAOXING-KEQIAO INSTISUTE OF ZHEJIANG SCI-TECH UNIVERSITY CO., LTD., Shaoxing (CN); ZHEJIANG SCI-TECH UNIVERSITY, Hangzhou (CN)

( * ) Notice: Subject to any disclaimer, the term of this patent is extended or adjusted under 35 U.S.C. 154(b) by 165 days.

(21) Appl. No.: 17/739,176

(22) Filed: May 9, 2022

(65) Prior Publication Data
US 2023/0257508 A1    Aug. 17, 2023

Related U.S. Application Data

(63) Continuation of application No. PCT/CN2022/086127, filed on Apr. 11, 2022.

(30) Foreign Application Priority Data

Feb. 14, 2022 (CN) .......................... 202210134031.0

(51) Int. Cl.
*C08G 18/75* (2006.01)
*C08G 18/24* (2006.01)
(Continued)

(52) U.S. Cl.
CPC ......... *C08G 18/755* (2013.01); *C08G 18/246* (2013.01); *C08G 18/3897* (2013.01);
(Continued)

(58) Field of Classification Search
CPC ........ C08G 18/32; C08G 18/42; C08G 18/48; C08G 18/66; C08G 18/755; C08K 3/041
See application file for complete search history.

(56) References Cited

FOREIGN PATENT DOCUMENTS

| CN | 102186927 A | 9/2011 |
|---|---|---|
| CN | 109354877 A | 2/2019 |

(Continued)

OTHER PUBLICATIONS

Yadong Xu, et al., Flexible and conductive polyurethane composites for electromagnetic shielding and printable circuit, Chemical Engineering Journal, 2018, pp. 1-10.
(Continued)

*Primary Examiner* — Khanh T Nguyen
(74) *Attorney, Agent, or Firm* — Bayramoglu Law Offices LLC

(57) ABSTRACT

An environmentally-friendly flexible conductive polyurethane (PU) and a preparation method thereof are disclosed. The environmentally-friendly flexible conductive PU is prepared by subjecting a mixture of a component A and a component B in a specified mass ratio to in-situ solvent-free polymerization, where the component A is prepared from a polyol, a T-type chain extender, a diselenide diol, high-conductivity carbon black, a dispersing agent, a catalyst, and a leveling agent, and the component B is prepared from a polyisocyanate, a polyol, a multi-walled carbon nanotube (MWCNT), and a dispersing agent. The PU has a reliable electrically-conductive function, and shows a self-healing function under room temperature or light conditions when damaged, wherein a microphase separation value HBI (0.5
(Continued)

to 3.0) of soft and hard segment molecules can be adjusted to achieve different hand touches and different mechanical properties, and an organic pollutant emission (volatile organic compound (VOC)) is less than 50 mg/kg.

20 Claims, 2 Drawing Sheets

(51) Int. Cl.
*C08G 18/38* (2006.01)
*C08G 18/40* (2006.01)
*C08G 18/42* (2006.01)
*C08G 18/48* (2006.01)
*C08G 18/66* (2006.01)
*C08K 3/04* (2006.01)
*C08K 7/18* (2006.01)
*H01B 1/24* (2006.01)
*B82Y 30/00* (2011.01)
*B82Y 40/00* (2011.01)

(52) U.S. Cl.
CPC ..... *C08G 18/4018* (2013.01); *C08G 18/4277* (2013.01); *C08G 18/4854* (2013.01); *C08G 18/6666* (2013.01); *C08K 3/041* (2017.05); *C08K 7/18* (2013.01); *H01B 1/24* (2013.01); *B82Y 30/00* (2013.01); *B82Y 40/00* (2013.01); *C08K 2201/001* (2013.01); *C08K 2201/003* (2013.01); *C08K 2201/004* (2013.01); *C08K 2201/005* (2013.01); *C08K 2201/006* (2013.01); *C08K 2201/011* (2013.01)

(56) References Cited

FOREIGN PATENT DOCUMENTS

| CN | 110527120 | A |   | 12/2019 |           |
|----|-----------|---|---|---------|-----------|
| CN | 111205631 | A |   | 5/2020  |           |
| CN | 111825872 | A |   | 10/2020 |           |
| CN | 113651938 | A | * | 11/2021 | C08G 18/32 |
| CN | 113651938 | A |   | 11/2021 |           |

OTHER PUBLICATIONS

Nuha Y. Al-Attabi, et al., Silver nanowire as an efficient filler for high conductive polyurethane composites, Materials Science and Technology, 2019, pp. 1-7.

Enrico Andreoli, et al., Carbon black instead of multiwall carbon nanotubes for achieving comparable high electrical conductivities in polyurethane-based coatings, Thin Solid Films, 2014, pp. 558-563, vol. 550.

* cited by examiner ning # ENVIRONMENTALLY-FRIENDLY FLEXIBLE CONDUCTIVE POLYURETHANE (PU) AND PREPARATION METHOD THEREOF

CROSS REFERENCE TO THE RELATED APPLICATIONS

This disclosure is a continuation application of International Application No. PCT/CN2022/086127, filed on Apr. 11, 2022, which is based upon and claims priority to Chinese Application No.: 202210134031.0, filed on Feb. 14, 2022, entitled "Environmentally-friendly Flexible Conductive Polyurethane (PU) Resin and Preparation Method Thereof", the entire contents of which are incorporated herein by reference.

TECHNICAL FIELD

The present disclosure relates to the field of preparation of flexible conductive materials, and in particular to an environmentally-friendly flexible solvent-free conductive polyurethane (PU) resin and a preparation method thereof.

BACKGROUND

PU resin is a general term for a class of polymer compounds in which there are urethane group units on a main chain synthesized from an isocyanate, a polyol, and a small-molecule chain extender. PU resin can be made into a PU plastic, a PU fiber, a PU rubber and elastomer, a PU coating, a PU adhesive, a PU synthetic leather, and the like, and is a very ideal flexible material.

Flexible conductive PU materials are a new group of composite materials with both electric conductivity and flexibility, and are widely used in fields such as wearable electronic devices, flexible sensors, and electronic skin. However, ordinary flexible conductive materials can be damaged due to friction, stretching, bending, and wrinkling during use, which compromises the electric conductivity and ultimately affects the normal functions of devices. Therefore, the introduction of a self-repairing or self-healing function into a flexible conductive PU material can help improve the reliability of electric conduction of the PU material.

Traditional flexible conductive PU materials are generally prepared by a solvent method, where a large amount of toxic and harmful solvents are used, such that a production process is not eco-friendly and causes pollution to the environment, and an end product is not environmentally friendly and causes damage to the health of a consumer.

Solvent-free PU with a self-healing function can well solve the above problems. At present, the intrinsic self-healing function of PU is a research hotspot, in which the self-healing of a material is realized mainly through breaking and recombining of chemical bonds. Common intrinsic self-healing mechanisms include S—S bonding, Diels-Alder reaction, hydrogen bonding, and the like. The self-healing of PU synthesized by disulfide bonding and Diels-Alder reaction needs to be achieved at a high temperature or under strong ultraviolet (UV) light, which limits its application range. Most of the technical solutions for synthesizing self-healing PU in literature need to introduce a solvent, which is not environmentally friendly.

Chinese patent CN111825872A discloses a self-healing conductive film with excellent healing performance, which is prepared by loading a silver nanowire on thermally-reversible Diels-Alder reaction-based PU. However, the self-healing effect needs to be achieved at a high temperature; in addition, the prepared PU film requires an organic solvent, which is not environmentally friendly; and the loaded conductive silver nanowire is costly and uneconomical. These problems significantly affect the application prospects of the PU film.

Chinese patent CN110527120A discloses a conductive self-healing PU film prepared by introducing a conductive filler into a self-healing PU resin. However, a solvent needs to be added during use of the PU film, and the solvent needs to be removed finally, which is likely to cause pollution. The addition of the filler is also difficult to lead to a PU film with both excellent electric conductivity and excellent mechanical performance, which affects its application prospects.

Therefore, the introduction of a conductive material into a self-healing PU system still faces some common problems: generally, in order to improve the electric conductivity of PU, an excessive amount of a conductive material is introduced, which will inevitably destroy the original mechanical performance and healing performance of the PU; or high-cost silver nanowire, silver nanoneedles, and the like are used, which is less economical.

SUMMARY

Based on the above problems, the present disclosure achieves prominent electric conductivity by dispersing a low-cost one-dimensional (1D) rod-shaped multi-walled carbon nanotube (MWCNT) and spherical high-conductivity carbon black in a PU matrix to form a special continuous structure; ensures the continuity of the conductive material structure by introducing a diselenide structure that can drive a self-healing reaction under room temperature or light conditions, such as to improve the reliability of the electric conductivity; adopts a solvent-free system for preparation to ensure the environmental friendliness of a preparation process and an end product; and can control the mechanical properties, hand touch, softness, and the like of the conductive PU by adjusting a microphase separation degree of soft and hard segment molecular structures.

The present disclosure provides a preparation method of an environmentally-friendly flexible conductive PU, including the following steps:

S1. preparation of a component A: heating one or more selected from the group consisting of a polyol, a diselenide diol, and a T-type chain extender to 50° C. to 130° C., adding high-conductivity carbon black and a dispersing agent, ultrasonically stirring, and adding a catalyst and a leveling agent to obtain a hydroxyl-terminated polymer, which is the component A;

S2. preparation of a component B: heating a polyisocyanate or a polyol to 50° C. to 130° C., adding an MWCNT and a dispersing agent, ultrasonically stirring, adding the remaining materials, and stirring at a high temperature to obtain an isocyanate-terminated prepolymer, which is the component B; and S3. preparation of the environmentally-friendly flexible conductive PU: adding the component A and the component B to a reactor according to a specified weight ratio, stirring at a high speed of 1,500 r/min to 2,000 r/min for 4 min to 10 min, and aging at 100° C. to 120° C. for 1 hour to 2 hours to obtain the environmentally-friendly flexible conductive PU.

Preferably, in S1, the component A may be prepared from the following components, in parts by weight: 60 to 90 parts of the polyol, 50 to 80 parts of the diselenide diol, 30 to 60 parts of the T-type chain extender, 0.1 to 2 parts of the high-conductivity carbon black, 0.01 to 0.2 part of the dispersing agent, 0.1 to 1 part of the catalyst, and 0.1 to 1 part of the leveling agent.

Preferably, in S2, the component B may be prepared from the following components, in parts by weight: 100 to 250 parts of the polyisocyanate, 30 to 100 parts of the polyol, 0.05 to 0.4 part of the MWCNT, and 0 to 0.1 part of the dispersing agent.

Preferably, in S3, a weight ratio of the component A to the component B may be 1:(1-1.1).

Preferably, in S1, a dynamic diselenide bond may be present in a molecular chain of the diselenide diol; and the T-type chain extender may have a structure in which there is a diolamine molecular chain with a side chain and there is a diamido group on the side chain.

Preferably, the polyisocyanate may be one or more selected from the group consisting of isophorone diisocyanate (IPDI), toluene diisocyanate (TDI), hexamethylene diisocyanate (HDI), and diphenylmethane diisocyanate (MDI); and the polyol may be one or more selected from the group consisting of polytetrahydrofuran ether glycol, polycaprolactone glycol, polypropylene glycol (PPG), polycarbonate diol, and polyethylene adipate glycol, and the polyol may have a relative molecular mass of 1,000 to 2,000 Da.

Preferably, the dispersing agent may be one or more selected from the group consisting of N-methylpyrrolidone (NMP), sodium dodecyl sulfate (SDS), and dodecylbenzene sulfonic acid (DBSA); the catalyst may be dibutyltin dilaurate or stannous octoate; and the leveling agent may be a leveling agent BYK-UV3510.

Preferably, the high-conductivity carbon black may be a spherical powder, and may have a particle size of 20 nm to 100 nm and a specific surface area (SSA) of 60 $m^2 \cdot g^{-1}$ to 1,000 $m^2 \cdot g^{-1}$; and the MWCNT may be rod-shaped or tubular, and may have a length of 0.5 μm to 40 μm and a diameter of 10 nm to 30 nm.

Preferably, the diselenide diol may have a structure of:

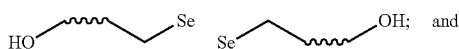

and the T-type chain extender may have a structure of:

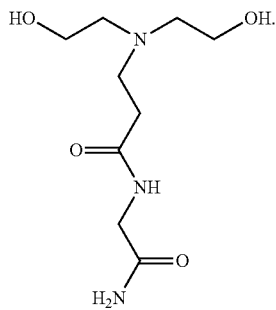 [SMILES: NC(=O)CNC(=O)CCN(CCO)CCO]

An environmentally-friendly flexible conductive PU prepared by the preparation method described above is provided.

Compared with the prior art, the present disclosure has the following advantages and beneficial effects:

1. The environmentally-friendly self-healing PU flexible conductive film prepared by the present disclosure has prominent self-healing performance, electric conductivity, and mechanical performance, and involves simple healing conditions.
2. In the conductive film prepared by the present disclosure, an MWCNT and high-conductivity nano-carbon black are introduced into PU to form a Go network-like structure inside the PU, and the two conductive fillers cooperate to achieve electric conduction, such that excellent electrical conductivity can be achieved at a small amount of the conductive fillers.
3. The PU resin synthesized by the present disclosure adopts diselenide bonds and hydrogen bonds, and the self-healing is achieved through the breaking and recombining of the diselenide bonds and hydrogen bonds, where the diselenide bonds can be triggered under visible light conditions, and the hydrogen bonds can be triggered under room temperature. The combination of the two solutions enables an excellent self-healing effect under room temperature and light conditions, and the required healing conditions are simple, which has promising application prospects.
4. The PU synthesized by the present disclosure does not require a solvent, which solves the problem of organic pollutant emission during the production and use of solvent-based PU. As the MWCNT and carbon black are used as conductive fillers, the low addition level, low cost, and electric conductivity can all be considered.
5. The PU synthesized by the present disclosure has prominent electric conductivity, with a volume resistivity of 1.8×104 Ω·cm; and the PU can be healed at room temperature under light for 12 hours when damaged, and the healed PU shows prominent performance, with a healing efficiency up to 90%, which can guarantee the safety and reliability of the conductive material and results in promising application prospects.

The above description is only an overview of the technical solutions of the present disclosure. In order to understand the technical means of the present disclosure more clearly, facilitate the implementation in accordance with the contents of the description, and make the above and other purposes, features and advantages of the present disclosure more obvious and easy to understand, the following specific embodiments of the present disclosure are present.

BRIEF DESCRIPTION OF THE DRAWINGS

In order to more clearly illustrate the technical solutions in the embodiments of the present disclosure or related technologies, a brief introduction of the accompanying drawings used in the description of the embodiments or related technologies is given. Obviously, the drawings in the following description are some embodiments of the present disclosure, for those of ordinary skill in the art, other drawings can also be obtained according to these drawings without any creative effort.

DETAILED DESCRIPTION OF THE EMBODIMENTS

Figure 1A:
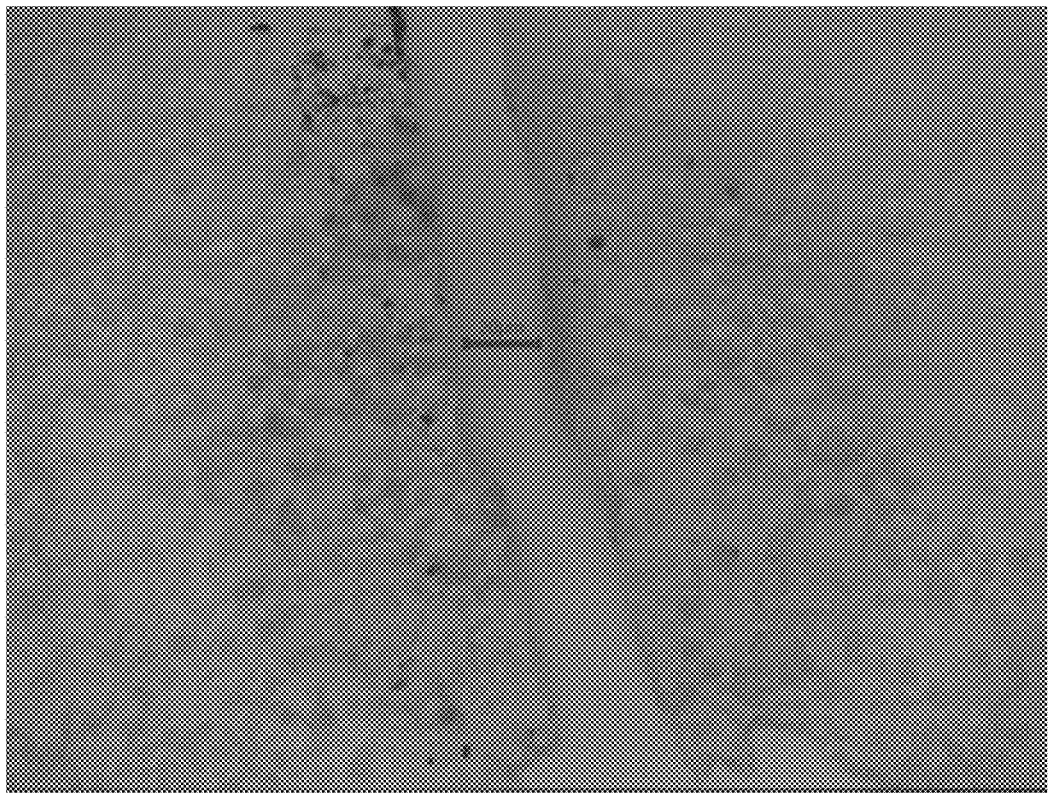
FIG. 1A shows the morphology of SFPU before the healing.

It should be noted that the examples in the present disclosure or features in the examples may be combined in a non-conflicting manner.

The technical solutions in the examples of the present disclosure are clearly and completely described below with reference to the accompanying drawings in the examples of the present disclosure. Apparently, the described examples are merely a part rather than all of the examples of the present disclosure. All other examples obtained by a person of ordinary skill in the art based on the examples of the present disclosure without creative efforts shall fall within the protection scope of the present disclosure.

Specific implementation steps are as follows (1) preparation of a component A: in parts by weight, 60 to 90 parts of a polyol, 50 to 80 parts of a diselenide diol, 30 to 60 parts of a T-type chain extender, 0.1 to 2 parts of high-conductivity carbon black, 0 to 0.2 part of a dispersing agent, 0.1 to 1 part of a catalyst, and 0.1 to 1 part of a leveling agent are taken; one or more selected from the group consisting of the polyol, the diselenide diol, and the T-type chain extender are heated to 50° C. to 130° C., then the high-conductivity carbon black and the dispersing agent are added, and a resulting mixture is ultrasonically stirred; and the remaining materials are added to obtain a hydroxyl-terminated polymer, which is the component A;

(2) preparation of a component B: in parts by weight, 100 to 250 parts of a polyisocyanate, 30 to 100 parts of a polyol, 0.05 to 0.4 part of an MWCNT, and 0 to 0.1 part of a dispersing agent are taken; the polyisocyanate or the polyol is heated to 50° C. to 130° C., the MWCNT and the dispersing agent are added, and a resulting mixture is ultrasonically stirred; and the remaining materials are added, and a resulting mixture is stirred at a high temperature to obtain an isocyanate-terminated prepolymer, which is the component B; and (3) the component A and the component B are added to a reactor according to a weight ratio of 1:(1-1.1), and a resulting mixture is stirred at a high speed of 1,500 r/min to 2,000 r/min for 4 min to 10 min and then aged at 100° C. to 120° C. for 1 hour to 2 hours to obtain the environmentally-friendly flexible conductive PU.

Example 1

An environmentally-friendly flexible conductive PU was prepared. The following raw materials in parts by weight were prepared:

raw materials for a component A: 85 parts of PPG, 30 parts of a T-type chain extender, 80 parts of a diselenide diol, 1 part of dibutyltin dilaurate, 1 part of high-conductivity carbon black, 0.1 part of DBSA, 0.1 part of dibutyltin dilaurate, and 0.1 part of a leveling agent BYK-UV3510; and raw materials for a component B: 100 parts of IPDI, 75 parts of PPG, 0.4 part of an MWCNT, and 0.1 part of DBSA.

Then, according to the above method, the 100 parts of IPDI were heated to 80° C., the 0.4 part of MWCNT and 0.1 part of DBSA were added, and a resulting mixture was ultrasonically stirred for 1 hour at a high temperature, cooled, then mixed with 75 parts of PPG, and stirred at a high speed for 20 min to obtain the component B; the 85 parts of PPG were heated to 90° C., the 1 part of high-conductivity carbon black and 0.1 part of DB SA were added, and a resulting mixture was ultrasonically stirred for 1 hour at a high temperature; and the 30 parts of T-type chain extender, 80 parts of diselenide diol, 0.1 part of dibutyltin dilaurate, and 0.1 part of leveling agent BYK-UV3510 were gradually added, and a resulting mixture was stirred for 10 min to obtain the component A.

The component B was added to the component A to allow a reaction at 1,500 r/min for 5 min, and a resulting material was poured into a mold, coated for film formation, and cured in a 100° C. oven for 1 hour to obtain a film, which was the environmentally-friendly flexible conductive PU.

Example 2

An environmentally-friendly flexible conductive PU was prepared. The following raw materials in parts by weight were prepared:

raw materials for a component A: 45 parts of polytetrahydrofuran ether glycol, 40 parts of polycaprolactone glycol, 40 parts of a T-type chain extender, 60 parts of a diselenide diol, 0.1 part of dibutyltin dilaurate, 0.1 part of a leveling agent BYK-UV3510, 1 part of high-conductivity carbon black, and 0.1 part of NMP; and raw materials for a component B: 78 parts of TDI, 40 parts of polytetrahydrofuran ether glycol, 35 parts of polycaprolactone glycol, 0.3 part of an MWCNT, and 0.1 part of NMP.

The 78 parts of TDI were heated to 100° C., the 0.3 part of MWCNT and 0.1 part of NMP were added, and a resulting mixture was ultrasonically stirred for 40 min at a high temperature, cooled, mixed with the 40 parts of polytetrahydrofuran ether glycol and 35 parts of polycaprolactone glycol, and stirred at a high speed for 20 min to obtain the component B; the 40 parts of T-type chain extender were heated to 60° C., the 1 part of high-conductivity carbon black and 0.1 part of NMP were added, and a resulting mixture was ultrasonically stirred for 1 hour at a high temperature and then cooled; and the 45 parts of polytetrahydrofuran ether glycol, 40 parts of polycaprolactone glycol, 60 parts of diselenide diol, 1 part of dibutyltin dilaurate, and 0.1 part of leveling agent were simultaneously added, and a resulting mixture was stirred at a high speed for 20 min to obtain the component A.

The component B was added to the component A to allow a reaction at 1,500 r/min for 10 min, and a resulting material was poured into a mold, coated for film formation, and cured in a 100° C. oven for 1 hour to obtain a film, which was the environmentally-friendly flexible conductive PU.

Figure 1B:
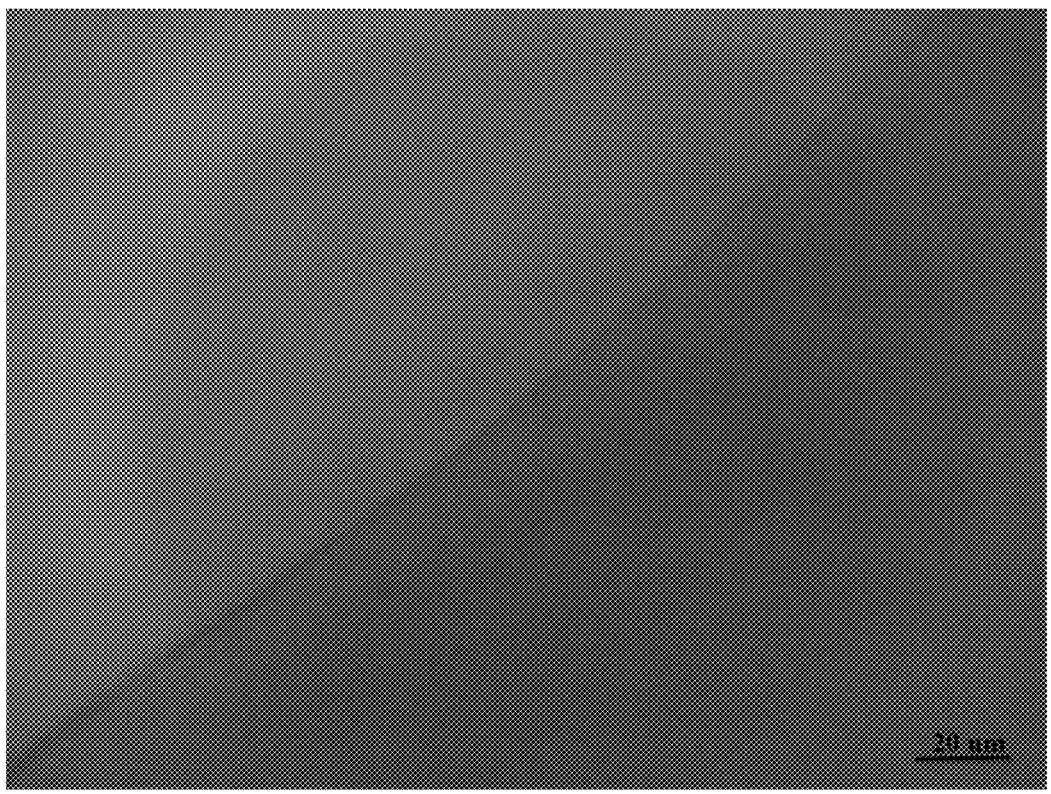
FIG. 1B shows the morphology of SFPU after the healing.

FIGS. 1A and 1B respectively shows optical microscopy images of the sample cut with a knife before and after healing at room temperature under light for 12 hours, and an obvious healing effect can be observed.

Example 3

An environmentally-friendly flexible conductive PU was prepared. The following raw materials in parts by weight were prepared:

raw materials for a component A: 85 parts of PPG, 45 parts of a T-type chain extender, 65 parts of a diselenide diol, 0.1 part of dibutyltin dilaurate, 0.1 part of a leveling agent BYK-UV3510, and 2 parts of high-conductivity carbon black; and raw materials for a component B: 78 parts of TDI, 75 parts of PPG, and 0.2 part of an MWCNT.

The 78 parts of TDI were heated to 80° C., the 0.2 part of MWCNT was added, and a resulting mixture was ultrasonically stirred for 1.5 hours at a high temperature, cooled, mixed with the 75 parts of PPG, and stirred at a high speed for 20 min to obtain the component B; the 85 parts of PPG were heated to 120° C., the 2 parts of high-conductivity carbon black were added, a resulting mixture was ultrasonically stirred for 1 hour at a high temperature and then cooled, and the 45 parts of T-type chain extender, 65 parts of diselenide diol, 0.1 part of dibutyltin dilaurate, and 0.1 part of leveling agent were gradually added to obtain the component A.

The component B was added to the component A to allow a reaction at 2,000 r/min for 5 min, and a resulting material was poured into a mold, coated for film formation, and cured in a 100° C. oven for 1.5 hours to obtain a film, which was the environmentally-friendly flexible conductive PU.

Example 4

An environmentally-friendly flexible conductive PU was prepared. The following raw materials in parts by weight were prepared:
raw materials for a component A: 85 parts of polytetrahydrofuran ether glycol, 50 parts of a T-type chain extender, 60 parts of a diselenide diol, 0.1 part of dibutyltin dilaurate, 0.1 part of a leveling agent BYK-UV3510, and 2 parts of high-conductivity carbon black; and
raw materials for a component B: 100 parts of IPDI, 75 parts of polytetrahydrofuran ether glycol, and 0.1 part of an MWCNT.

The 100 parts of IPDI were heated to 60° C., the 0.1 part of MWCNT was added, and a resulting mixture was ultrasonically stirred for 30 min at a high temperature, cooled, mixed with the 75 parts of polytetrahydrofuran ether glycol, and stirred at a high speed for 15 min to obtain the component B; the 85 parts of polytetrahydrofuran ether glycol were heated to 100° C., the 2 parts of high-conductivity carbon black were added, and a resulting mixture was ultrasonically stirred for 1 hour at a high temperature and then cooled, and the 50 parts of T-type chain extender, 60 parts of diselenide diol, 0.1 part of dibutyltin dilaurate, and 0.1 part of leveling agent BYK-UV3510 were gradually added to obtain the component A.

The component B was added to the component A to allow a reaction at 2,000 r/min for 8 min, and a resulting material was poured into a mold, coated for film formation, and cured in a 120° C. oven for 1 hour to obtain a film, which was the environmentally-friendly flexible conductive PU.

The performance of Examples 1 to 4 was tested:

TABLE 1

| | Example 1 | Example 2 | Example 3 | Example 4 |
|---|---|---|---|---|
| Electric conductivity/volume resistivity | $1.6 \times 10^4$ $\Omega \cdot cm$ | $1.8 \times 10^4$ $\Omega \cdot cm$ | $1.7 \times 10^4$ $\Omega \cdot cm$ | $1.8 \times 10^4$ $\Omega \cdot cm$ |
| Healing conditions | Room temperature, light, 12 h | Room temperature, light, 12 h | Room temperature, light, 12 h | Room temperature, light, 12 h |
| Healing efficiency | 90% | 85% | 86% | 85% |

A variety of performance data tested according to national standards can be obtained from Table 1.

Comparative Example

The test performances of various conductive PUs currently available are shown in Table 2 (data sources).

TABLE 2

| Conductive material | Silver nanowire[1] | T-ZnO/Ag nanofiller[2] | Silver nanowire[3] | MWCNT[4] |
|---|---|---|---|---|
| Preparation conditions | Solvent-based PU | Waterborne polyurethane (WPU) | Solvent-based PU | WPU |
| Electric conductivity | Resistance: 0.23 MΩ to 2.86 MΩ | Conductivity: $6.35 \times 10^4$ S/m, and resistance: 0.52 Ω | Conductivity: 353 S/cm | Conductivity: 500 S/cm |
| Self-healing conditions | Thermally-reversible DA reaction | No healing performance | No healing performance | No healing performance |

[1]CN111825872A Self-healing transparent polyurethane composite material with electric conductivity and thermal reversibility, and preparation method thereof.
[2]Xu, Y, Yang Y, Yan D X, et al. Flexible and conductive polyurethane composites for electromagnetic shielding and printable circuit[J]. Chemical Engineering Journal, 2019, 360: 1427-1436.
[3]Al-Attabi N Y, Adhikari R, Cass P, et al. Silver nanowire as an efficient filler for high conductive polyurethane composites[J]. Materials and Technology, 2019, 35(4): 462-468.
[4]Andreoli E, Liao K S, Cricini A, et al. Carbon black instead of mutiwall carbon nanotubes for achieving comparable high electrical conductivities in polyurethane-based coatings[J]. Thin Solid Films, 2014, 550: 558-563.

Figure 2:
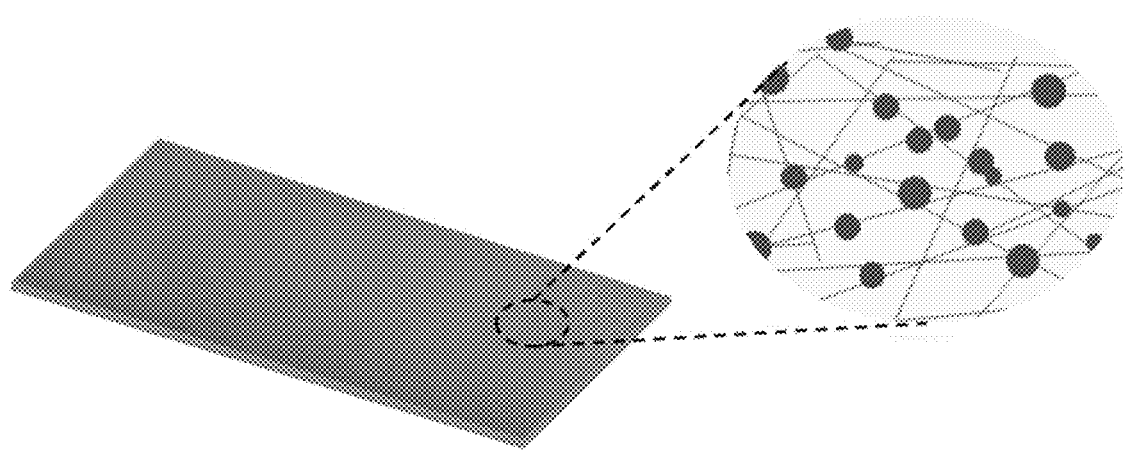
FIG. 2 is a schematic diagram illustrating the formation of a conductive network inside the SFPU film.

FIGS. 1A and 1B respectively shows optical microscopy images of the sample in the example cut with a knife before and after healing at room temperature under light for 12 hours, and an obvious healing effect can be observed. FIG. 2 is a schematic diagram illustrating a conductive network of the film.

Through performance comparison of the environmentally-friendly flexible conductive PU prepared by the present disclosure with a flexible conductive PU prepared by an existing solution, it can be seen that the PU synthesized by the present disclosure has prominent electric conductivity, with a volume resistivity of $1.8 \times 10^4$ Ω·cm; and the PU can be healed at room temperature under light for 12 hours when damaged, and the healed PU shows prominent performance, with a healing efficiency up to 90%, which can guarantee the safety and reliability of the conductive material.

The self-healing conductive PU synthesized by the present disclosure can achieve an electric conduction effect and a low percolation threshold at a low addition level, and the PU prepared by this solution does not require a solvent, is healthy and environmentally friendly, and involves simple self-healing conditions.

The environmentally-friendly self-healing PU flexible conductive films prepared in the examples of the present disclosure have prominent self-healing performance, electric conductivity, and mechanical performance, and involves simple healing conditions. In the conductive film, an MWCNT and high-conductivity nano-carbon black are introduced into PU to form a Go network-like structure inside the PU, and the two conductive fillers cooperate to achieve electric conduction, such that excellent electrical conductivity can be achieved at a small amount of the conductive fillers. The PU resin adopts diselenide bonds and hydrogen bonds, and the self-healing is achieved through the breaking and recombining of the diselenide bonds and hydrogen bonds, where the diselenide bonds can be triggered under visible light conditions, and the hydrogen bonds can be triggered under room temperature. The combination of the two solutions enables an excellent self-healing effect under room temperature and light conditions, and the required healing conditions are simple, which has promising application prospects. Moreover, the PU does not require a solvent, which solves the problem of organic pollutant emission during the production and use of solvent-based PU.

As the MWCNT and carbon black are used as conductive fillers, the low addition level, low cost, and electric conductivity can all be considered.

In summary, the conductive PU obtained by the technical solution of the present disclosure has promising application prospects.

Finally, it should be noted that the above are only preferred examples of the present disclosure and are not intended to limit the present disclosure. Although the present disclosure has been described in detail with reference to the above examples, those skilled in the art can still modify the technical solutions described in the above examples, or equivalently substitute some of the technical features of the examples. Any modifications, equivalent substitutions, improvements, and the like within the spirit and principle of the present disclosure should fall within the protection scope of the present disclosure.

What is claimed is:

1. A preparation method of an environmentally-friendly flexible conductive polyurethane (PU), comprising the following steps:
   1) Preparation of a first component, comprising: heating at least one reagent selected from the group consisting of a polyol, a diselenide diol, and a T-type chain extender to 50° C. to 130° C., adding high-conductivity carbon black and a dispersing agent, ultrasonically stirring, and adding a catalyst and a leveling agent to obtain a hydroxyl-terminated polymer as the first component;
   2) Preparation of a second component, comprising: heating a polyisocyanate or the polyol to 50° C. to 130° C., adding a multi-walled carbon nanotube (MWCNT) and the dispersing agent, ultrasonically stirring, adding remaining materials, and stirring at a predetermined temperature to obtain an isocyanate-terminated prepolymer as the second component; and
   3) Preparation of the environmentally-friendly flexible conductive PU: adding the first component and the second component to a reactor according to a specified weight ratio, stirring at a high speed of 1,500 r/min to 2,000 r/min for 4 min to 10 min, and aging at 100° C. to 120° C. for 1 hour to 2 hours to obtain the environmentally-friendly flexible conductive PU.

2. The preparation method of the environmentally-friendly flexible conductive PU according to claim 1, wherein in step 1, the first component is prepared from the following components, in parts by weight: 60 to 90 parts of the polyol, 50 to 80 parts of the diselenide diol, 30 to 60 parts of the T-type chain extender, 0.1 to 2 parts of the high-conductivity carbon black, 0.01 to 0.2 parts of the dispersing agent, 0.1 to 1 part of the catalyst, and 0.1 to 1 part of the leveling agent.

3. The preparation method of the environmentally-friendly flexible conductive PU according to claim 2, wherein in step 2, the second component is prepared from the following components, in parts by weight: 100 to 250 parts of the polyisocyanate, 30 to 100 parts of the polyol, 0.05 to 0.4 parts of the MWCNT, and 0 to 0.1 parts of the dispersing agent.

4. The preparation method of the environmentally-friendly flexible conductive PU according to claim 3, wherein in step 3, the specified weight ratio of the first component to the second component is 1:(1-1.1).

5. The preparation method of the environmentally-friendly flexible conductive PU according to claim 2, wherein in step 3, the specified weight ratio of the first component to the second component is 1:(1-1.1).

6. The preparation method of the environmentally-friendly flexible conductive PU according to claim 1, wherein in step 3, the specified weight ratio of the first component to the second component is 1:(1-1.1).

7. The preparation method of the environmentally-friendly flexible conductive PU according to claim 6, wherein in step 1,
   a dynamic diselenide bond is present in a molecular chain of the diselenide diol; and
   the T-type chain extender has a structure comprising a diolamine molecular chain with a side chain and a diamido group on the side chain.

8. The preparation method of the environmentally-friendly flexible conductive PU according to claim 7, wherein
   the dispersing agent is at least one selected from the group consisting of N-methylpyrrolidone (NMP), sodium dodecyl sulfate (SDS), and dodecylbenzene sulfonic acid (DBSA); and
   the catalyst is dibutyltin dilaurate or stannous octoate.

9. The preparation method of the environmentally-friendly flexible conductive PU according to claim 8, wherein
   the high-conductivity carbon black is a spherical powder, and has a particle size of 20 nm to 100 nm and a specific surface area (SSA) of 60 $m^2·g^{-1}$ to 1,000 $m^2·g^{-1}$; and
   the MWCNT is rod-shaped or tubular, and has a length of 0.5 μm to 40 μm and a diameter of 10 nm to 30 nm.

10. The preparation method of the environmentally-friendly flexible conductive PU according to claim 8, wherein
    the diselenide diol has a structure of:

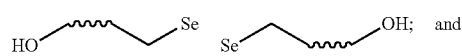

the structure of the T-type chain extender is:

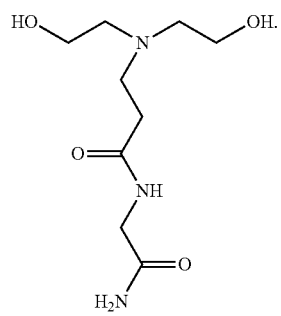 [SMILES: NC(=O)CNC(=O)CCN(CCO)CCO]

11. The preparation method of the environmentally-friendly flexible conductive PU according to claim 7, wherein
    the high-conductivity carbon black is a spherical powder, and has a particle size of 20 nm to 100 nm and a specific surface area (SSA) of 60 $m^2·g^{-1}$ to 1,000 $m^2·g^{-1}$; and
    the MWCNT is rod-shaped or tubular, and has a length of 0.5 μm to 40 μm and a diameter of 10 nm to 30 nm.

12. The preparation method of the environmentally-friendly flexible conductive PU according to claim 7, wherein the diselenide diol has a structure of:

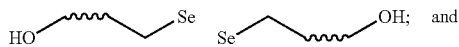

the structure of the T-type chain extender is:

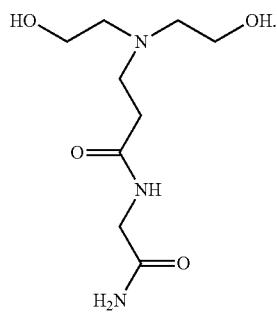 [SMILES: NC(=O)CNC(=O)CCN(CCO)CCO]

13. The preparation method of the environmentally-friendly flexible conductive PU according to claim 6, wherein
the polyisocyanate is at least one selected from the group consisting of isophorone diisocyanate (IPDI), toluene diisocyanate (TDI), hexamethylene diisocyanate (HDI), and diphenylmethane diisocyanate (MDI); and
the polyol is at least one selected from the group consisting of polytetrahydrofuran ether glycol, polycaprolactone glycol, polypropylene glycol (PPG), polycarbonate diol, and polyethylene adipate glycol, and the polyol has a relative molecular mass of 1,000 to 2,000 Da.

14. The preparation method of the environmentally-friendly flexible conductive PU according to claim 13, wherein
the high-conductivity carbon black is a spherical powder, and has a particle size of 20 nm to 100 nm and a specific surface area (SSA) of 60 $m^2 \cdot g^{-1}$ to 1,000 $m^2 \cdot g^{-1}$; and
the MWCNT is rod-shaped or tubular, and has a length of 0.5 μm to 40 μm and a diameter of 10 nm to 30 nm.

15. The preparation method of the environmentally-friendly flexible conductive PU according to claim 13, wherein the diselenide diol has a structure of:

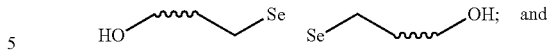

the T-type chain extender has a structure of:

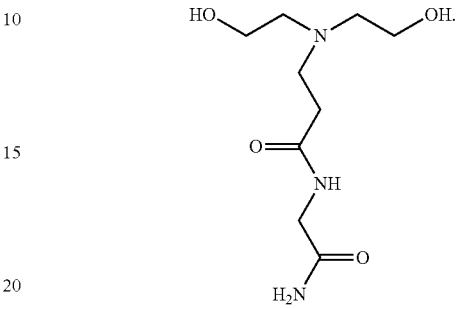

16. An environmentally-friendly flexible conductive PU prepared by the preparation method according to claim 1.

17. The environmentally-friendly flexible conductive PU according to claim 16, wherein in step 1, the first component is prepared from the following components, in parts by weight: 60 to 90 parts of the polyol, 50 to 80 parts of the diselenide diol, 30 to 60 parts of the T-type chain extender, 0.1 to 2 parts of the high-conductivity carbon black, 0.01 to 0.2 parts of the dispersing agent, 0.1 to 1 part of the catalyst, and 0.1 to 1 part of the leveling agent.

18. The environmentally-friendly flexible conductive PU according to claim 17, wherein in step 2, the second component is prepared from the following components, in parts by weight: 100 to 250 parts of the polyisocyanate, 30 to 100 parts of the polyol, 0.05 to 0.4 parts of the MWCNT, and 0 to 0.1 parts of the dispersing agent.

19. The environmentally-friendly flexible conductive PU according to claim 16, wherein in step 3, the specified weight ratio of the first component to the second component is 1:(1-1.1).

20. The environmentally-friendly flexible conductive PU according to claim 19, wherein in step 1,
a dynamic diselenide bond is present in a molecular chain of the diselenide diol; and
the T-type chain extender has a structure comprising a diolamine molecular chain with a side chain and a diamido group on the side chain.

* * * * *